US008611892B2

(12) United States Patent
Iwasaki et al.

(10) Patent No.: US 8,611,892 B2
(45) Date of Patent: Dec. 17, 2013

(54) MOBILE COMMUNICATION NETWORK SYSTEM AND A MOBILITY MANAGING UNIT

(75) Inventors: Atsushi Iwasaki, Yokosuka (JP); Takatoshi Okagawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1262 days.

(21) Appl. No.: 11/071,178

(22) Filed: Mar. 4, 2005

(65) Prior Publication Data
US 2005/0201344 A1 Sep. 15, 2005

(30) Foreign Application Priority Data

Mar. 4, 2004 (JP) ................................. 2004-060454

(51) Int. Cl.
*H04W 36/00* (2009.01)
(52) U.S. Cl.
USPC ......... 455/432.1; 455/436; 370/331; 370/389
(58) Field of Classification Search
USPC ................ 455/432.1, 436; 370/331, 389, 902
See application file for complete search history.

(56) References Cited

U.S. PATENT DOCUMENTS

| | | | |
|---|---|---|---|
| 6,980,802 B2 * | 12/2005 | Jung .............................. | 455/436 |
| 7,142,858 B2 | 11/2006 | Aoki et al. | |
| 7,184,418 B1 * | 2/2007 | Baba et al. ..................... | 370/331 |
| 7,190,678 B2 * | 3/2007 | Thubert et al. ................. | 370/254 |
| 7,672,288 B1 * | 3/2010 | Iartym .......................... | 370/349 |
| 2003/0142681 A1 * | 7/2003 | Chen et al. ..................... | 370/401 |
| 2003/0144001 A1 | 7/2003 | Nakatsugawa et al. | |
| 2006/0072481 A1 * | 4/2006 | Hirsbrunner et al. ......... | 370/254 |
| 2006/0209760 A1 * | 9/2006 | Saito et al. .................... | 370/331 |

FOREIGN PATENT DOCUMENTS

| | | |
|---|---|---|
| EP | 0 823 827 A2 | 2/1998 |
| WO | WO 01/31472 A1 | 5/2001 |
| WO | 02/104053 A1 | 12/2002 |

OTHER PUBLICATIONS

Eunsoo Shim, et al., "Secure Candidate Access Router Discovery", Wireless Communications and Networking, IEEE, XP-002323683, vol. 4, Mar. 16, 2003, pp. 1819-1824.
J. Loughney, et al., "Context Transfer Protocol", IETF Standard-Working-Draft. Internet Engineering Task Force, IETF, XP-015003309, Jun. 2003, pp. 1-19.
Atsushi Iwasaki, et al., "Local/Global Routing Management for IP-based IMT network Platform", IEICE Society Conference, Mar. 2003, 1 Page.

* cited by examiner

*Primary Examiner* — Charles Appiah
*Assistant Examiner* — Jaime Holliday
(74) *Attorney, Agent, or Firm* — Oblon, Spivak, McClelland, Maier & Neustadt, L.L.P.

(57) ABSTRACT

A mobile communication network system (1) is disclosed. The network system comprises a transport network (30) including a plurality of routers (31), and a network control apparatus (20) for controlling mobility of a mobile node (40, MN1), characterized in that the network control apparatus (20) comprises a mobility managing unit (LRM1) for managing information (CDT) of a correspondent node (41, MN2) communicating with the mobile node (40, MN1); the mobility managing unit (LRM1) comprises a boundary router detecting unit for detecting that the mobile node (MN1) moves and reaches a boundary of a router (AR2) managed by the mobility managing unit (LRM1) itself; and a correspondent node information forwarding unit for forwarding the information (CDT) of the correspondent node (MN2) to a neighbor mobility managing unit (LRM2) having a similar structure, when it is detected that the mobile node (MN1) reaches a boundary of a router (AR2) managed by the mobility managing unit (LRM1) itself.

7 Claims, 5 Drawing Sheets

FIG.3

LRM1

| AR | Location | NEIGHBOR LRM | AR BELONGING TO NEIGHBOR LRM |
|---|---|---|---|
| AR1 | XX | – | – |
| AR2 | XY | LRM2 | AR3 |
| ⋮ | ⋮ | ⋮ | ⋮ |

~(a)

MOBILE COMMUNICATION NETWORK SYSTEM AND A MOBILITY MANAGING UNIT

BACKGROUND OF THE INVENTION

The present invention generally relates to a mobile communication network system and a mobility managing unit for managing mobility of a mobile node when handing-over.

Nowadays, research is being conducted relating to the next generation mobile communication network for "Beyond IMT-2000" after the third generation mobile communications. It is believed that the next generation mobile communications needs a network in which multimedia traffic and audio traffic can be effectively processed by IP (Internet Protocol) based network processing. A subject for mobile communication service is not only human but also all kinds of moving objects such as automobiles, bicycles, pets, parcels, etc. Therefore, how to effectively realize mobility management is becoming important.

In general mobile communication network systems, location information of a mobile node (MN) is managed by a mobility managing unit (RM: Routing Manager). When the mobile node moves over base stations and should be handed-over, the mobile node registers its location in this RM to control hand-over of the mobile node.

On the other hand, according to a technology described in Non-patent Document #1, for a mobile node (MN), an HRM (Home Routing Manager) to which the MN belongs and an LRM (Local Routing Manager) are defined and these two mangers manage the MN mobility. The LRM has a function for managing location information of the MN within a certain area and a function for managing a CN (Correspondent Node), and the HRM has a function for managing the location of a network in which the mobile node is located.

In this type of network, in order that the MN moves and continues to communicate with the CN even after connecting to a new neighbor base station, the new base station needs to revise a cache table (CST: Cache for Source Terminal) indicating the location information of the MN in the network within which the MN is located, and reset a cache table (CDT: Cache for Destination Terminal) indicating the location information of the CN. This resetting is performed by the base station asking the LRM.

When the MN continues to move, it may go beyond the area managed by the present LRM and move to an area managed by a neighbor LRM (hand-over beyond LRM). Even when handing-over beyond LRM, the base station asks a new LRM about CDT, but the new LRM does not have CDT information.

In the third generation IMT-2000 mobile communication network, the MN transmits information of the old LRM to a new LRM after handing-over, and the new LRM asks the old LRM for the information. If this technique is applied to the present technical field, the MN transmits the old LRM information to a new LRM, and the new LRM asks the old LRM for the CDT information.

In the IMT-2000 mobile communication network, forwarded information is a user profile, which is not related to hand-over control. However, in the present technical field, the LRM directly controls hand-over, and if the CDT information is not forwarded, then the hand-over control is not completed.

Non-Patent Document #1

A. Iwasaki, et al, "Local/Global Routing Management for IP-based IMT network Platform", IEICE Society Conference, March 2003.

However, the above explained related art examples have the following problems. With reference to FIG. 5, related art problems in forwarding the CDT information when handing-over is explained below.

In a related art system as shown in FIG. 5, when an MN1 connected to an AR2 (Access Router 2) belonging to an LRM1 moves and is handed-over to a new LRM, the new LRM asks the old LRM for CDT information for taking over. The MN1 connected to the AR2 belonging to the LRM1 is communicating with an MN2 (correspondent node) belonging to an LRM 3, and is handed-over from the LRM1 to the LRM2.

An IPha (IP-host address) is defined as an IP address for identifying a mobile node in this application. The IPha of the MN1 is #M1, and the IPha of the MN2 is #M2.

In FIG. 5, when the MN1 moves over to the AR2 managed by the LRM1 (step S21), the MN1 transmits to an AR3 an Activation indicating that the MN1 will be connected to the AR3 managed by the LRM2 (step S22). The Activation includes information of the LRM1 that is the old LRM.

Upon receiving the Activation, the AR3 allocates an IPra (IP routing address) for the MN1, creates a cache table CST (#M1←→AR3a) for itself, and transmits to the LRM2 managing the MN1 an Active Notification (AN). At this time, the old LRM information included in the Activation is also transmitted together (step S23).

The LRM2 as a new LRM receives the Active Notification from the MN1, and requests the LRM1 as the old LRM to forward CDT information (#M2←→ANR3a) by sending Forwarding Request (step S24). In response to the Forwarding Request, the LRM1 as the old LRM forwards the CDT information to the LRM2 as the new LRM (step S25). The LRM2 stores the CDT information of the correspondent node MN2 forwarded from the LRM1 (step S26), and transmits to the AR3 an IPra Update (IPU) defining CST and CDT of a router (step S27). The AR3 revises the CST and resets the CDT to make it possible to continue communication after hand-over.

In the related art method, since the LRM2 asks the LRM1 for the CDT information and performs taking over after the MN1 moves to an area managed by the LRM2, it takes a lot of time until transmitting the IPra Update to the AR3. That is, it takes a lot of time to create a correspondent node cache table when handing-over.

And in the related art method, control signals from the MN should include the old LRM information, and therefore radio resources are wastefully consumed.

SUMMARY OF THE INVENTION

A general object of the present invention is to provide a mobile communication network system and a mobility managing unit in which communication quality is improved by shortening time required for making a correspondent node cache table when handing-over.

The above object of the present invention is achieved by a mobile communication network system (1) comprising a transport network (30) including a plurality of routers (31), and a network control apparatus (20) for controlling mobility of a mobile node (40, MN1), characterized in that: the network control apparatus (20) comprises a mobility managing unit (LRM1) for managing information (CDT) of a correspondent node (41, MN2) communicating with the mobile node (40, MN1); the mobility managing unit (LRM1) comprises, a boundary router detecting unit for detecting that the mobile node (MN1) moves and reaches a boundary of a router (AR2) managed by the mobility managing unit (LRM1)

itself; and a correspondent node information forwarding unit for forwarding the information (CDT) of the correspondent node (MN2) to a neighbor mobility managing unit (LRM2) having a similar structure, when it is detected that the mobile node (MN1) reaches a boundary of a router (AR2) managed by the mobility managing unit (LRM1) itself.

The mobility managing unit (LRM1) may further comprise a router location information holding unit for holding geometrical location information of routers connectable by the mobile node; and a table generating unit for recognizing a boundary router (AR2) near a boundary between the mobility managing unit (LRM1) itself and the neighbor mobility managing unit (LRM2) based on the geometrical location information of the router (AR2), and generating a table (FIG. 3) in which the neighbor mobility managing unit (LRM2) to which an adjacent router (AR3) adjacent to the recognized boundary router (AR2) belongs is correlated as the neighbor mobility managing unit to which the information of the correspondent node (MN2) should be transferred.

The mobility managing unit (LRM1) may further comprise a delete instruction transmitting unit for transmitting instruction data having the neighbor mobility managing unit (LRM2) delete the information of the correspondent node (MN2) when the mobile node (MN1) moves from the boundary router (AR2) to an internal router (AR1).

The forwarded information (CDT) of the correspondent node (MN2) may be location information of the correspondent node (41).

According to another feature of the present invention, a mobility managing unit (LRM1) having a function for managing information (CDT) of a correspondent node (MN2) communicating with a mobile node (MN1), and a function for controlling hand-over is disclosed. The mobility managing unit comprises a boundary router detecting unit for detecting that the mobile node (MN1) moves and reaches a boundary of a router (AR2) managed by the mobility managing unit (LRM1) itself; and a correspondent node information forwarding unit for forwarding the information (CDT) of the correspondent node (MN2) to a neighbor mobility managing unit (LRM2) having a similar structure, when it is detected that the mobile node (MN1) reaches a boundary of a router (AR2) managed by the mobility managing unit (LRM1) itself.

According to embodiments of the present invention, a mobile communication network system and a mobility manager are realized in which communication quality is improved by shortening time required for making a correspondent node cache table when handing-over.

BRIEF DESCRIPTION OF THE DRAWINGS

FIG. 3 shows an example of a table managed by the LRM;

DESCRIPTION OF THE PREFERRED EMBODIMENTS

Figure 1:
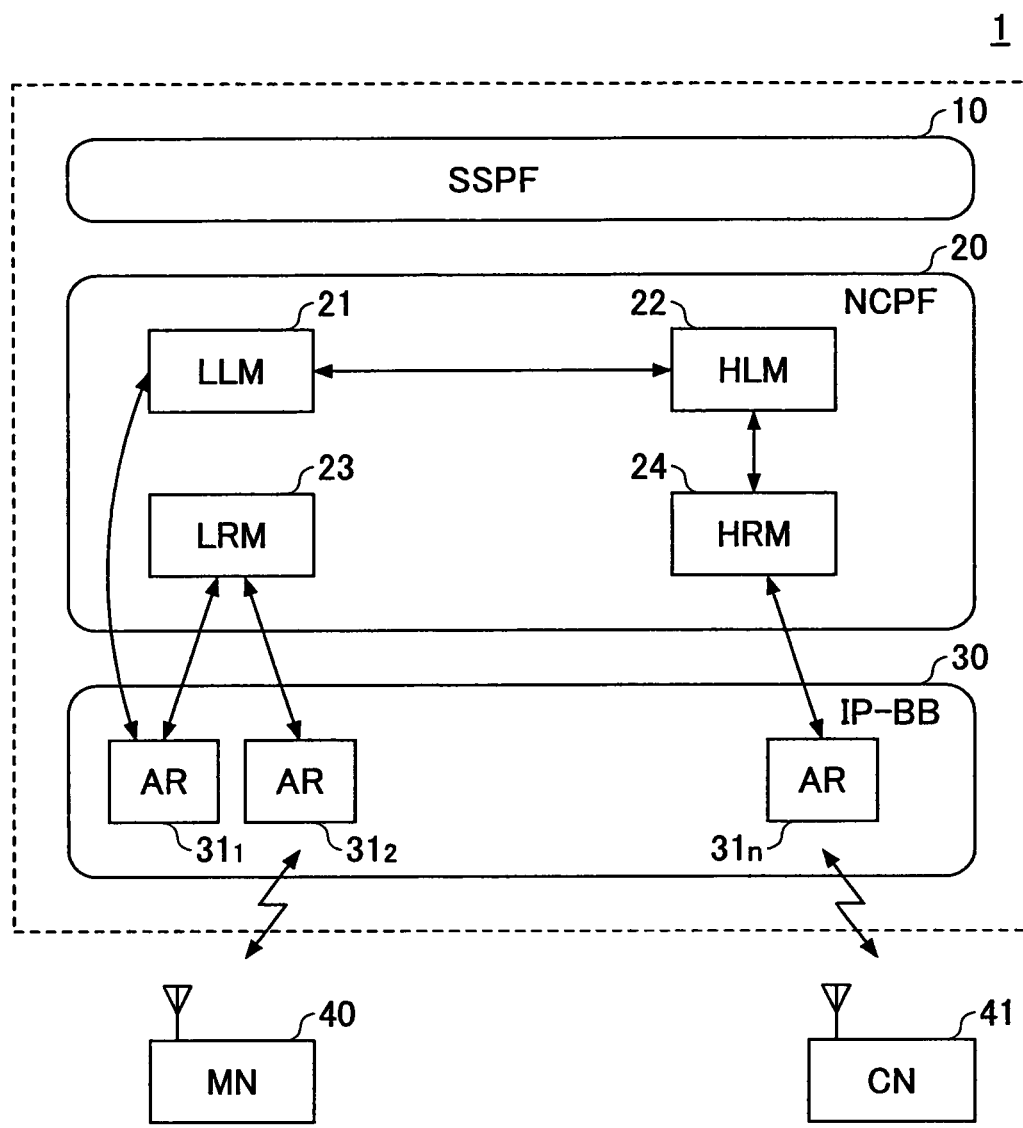
FIG. 1 schematically shows a mobile communication network system according to an embodiment of the present invention.

The following is a description of embodiments of the present invention, with reference to the accompanying drawings.

Throughout all the figures, members and parts having the same or similar functions are assigned the same or similar reference numerals or symbols, and redundant explanations are omitted.

A mobile communication network system according to an embodiment of the present invention can be constructed as shown in FIG. 1, for example.

In FIG. 1, this mobile communication network system 1 comprises an SSPF (Service Support Platform) 10 having service support performing functions, an NCPF (Network Control PlatForm) 20 having network control platform functions such as network routing control or QoS control, etc., an IP-BB (IP BackBone) 30 including access routers (ARs) $31_1$~$31_n$ for transferring IP packets, an MN (Mobile Node) 40 for radio-communicating with a radio accesses system (not shown) contained in the IP-BB 30, and a CN (Correspondent Node) 41 communicating with the MN 40. The NCPF 20 is equipped with a mobility management function necessary for managing mobile communication, which function can be generally divided to an LLM (Local Location Management) unit 21, an HLM (Home Location Management) unit 22, an LRM (Local Routing Management) unit 23 and an HRM (Home Routing Management) unit 24. The location management means grasping a location (that is location information) of a not-communicating mobile terminal in a network and calling the mobile terminal using its location information to activate it into communication status.

On the other hand, the routing management means grasping a routing address of a communicating mobile terminal, combining the routing address and an identification address of the mobile terminal into routing information and setting the routing information in an AR on the communicating route in the transferring network.

Figure 2:
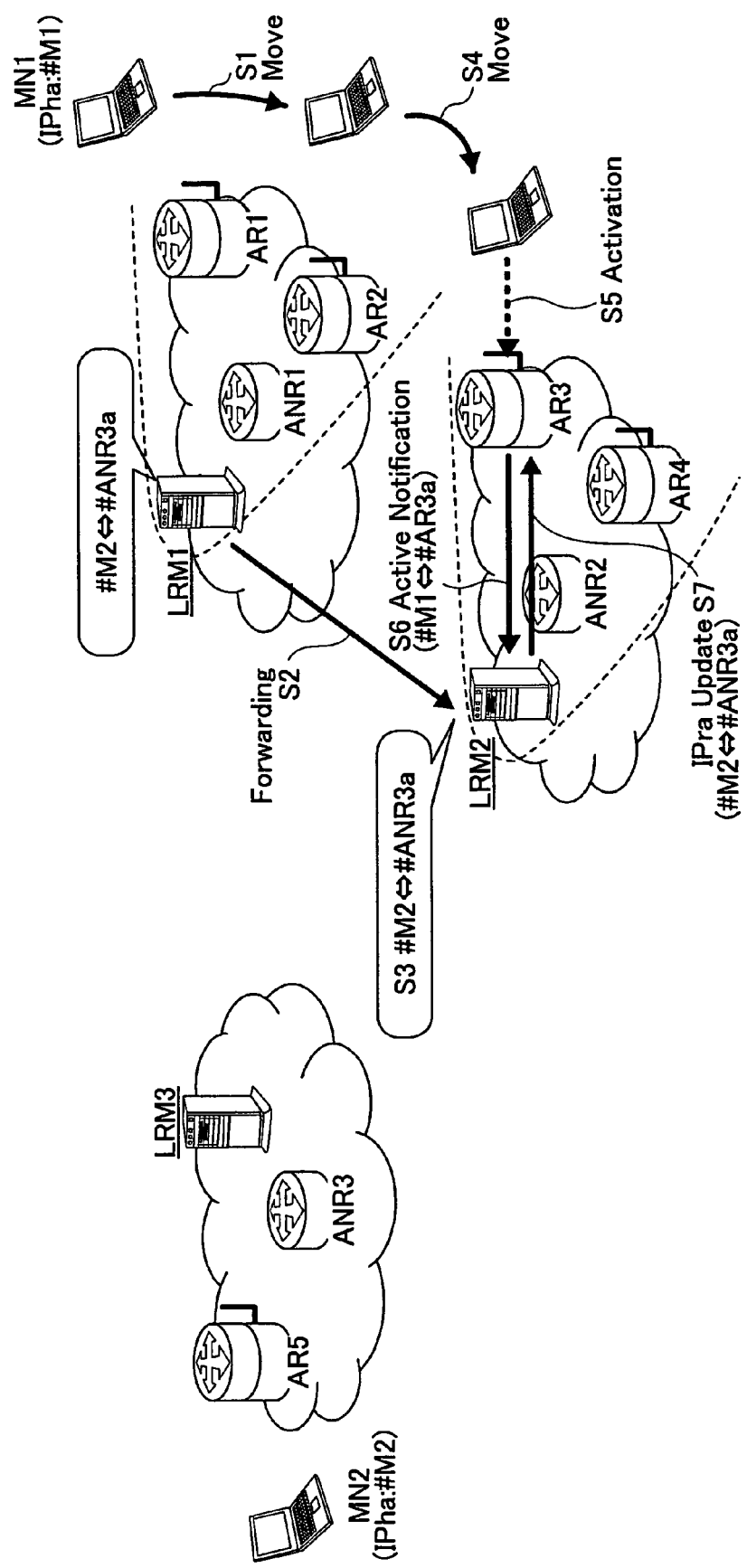
FIG. 2 schematically shows a procedure of taking over CDT information in the mobile communication network system shown in FIG. 1.

Operation of the mobile communication network system constructed as above according to the embodiment of the present invention is explained below with reference to FIG. 2. In FIG. 2, the LRM1 manages AR1, AR2, ANR1 (Anchor Router 1), the LRM2 manages AR3, AR4, ANR2 and the LRM3 manages AR5, ANR3.

In this embodiment, the MN1 connecting to the AR1 belonging to the LRM1 is now communicating with the MN2 (correspondent node) connecting to the AR5 belonging to the LRM3. A procedure for transferring CDT information when the MN1 is handed-over from the LRM1 to the LRM2 is explained below.

The MN1 moves from the AR1 to the AR2 (AR1→AR2), which is managed by the LRM1 and located near a boundary (step S1). The LRM1 keeps location information (geometrical arrangement information) of every AR which is connected by MNs. Based on the location information of the ARs, the LRM1 recognizes an AR ("boundary AR") near a boundary between the LRM1 and a neighbor LRM and a neighboring AR ("neighbor AR") belonging to the neighbor LRM, and correlates the boundary AR with the neighbor AR and the neighbor LRM to make a correlation table.

FIG. 3 shows an example of such a correlation table. In this example, the AR2 (as a boundary AR) belonging to the LRM1 and located near the boundary between the LRM1 and the LRM2 (as a neighbor LRM), the LRM2, and the AR3 (as an AR belonging to the neighbor LRM) are correlated (See (a) in FIG. 3).

In response to detecting that the MN1 moved from the AR1 to AR2, after performing cache revision processing for normal hand-over, and the LRM1 looks at the table to find out an AR adjacent to the AR2 to which the MN1 will possibly move and it's managing LRM (LRM2). Then the LRM1 transfers or forwards the CDT information (#M2←→#ANR3a) of the correspondent node MN2 to the LRM2 (step S2). The LRM2 stores the CDT information forwarded by the LRM1 (Step S3). In this manner, by detecting that the MN1 is near the AR2 at the boundary to the neighbor LRM2, the LRM1 can grasp the possibility of the MN1 moving to the LRM2.

After the MN1 is handed-over from the LRM1 to the LRM2 (step S4), the MN1 transmits an Activation indicating that the MN1 is connected to the AR3 (step S5).

Upon receiving the Activation from the MN1, the AR3 allocates an IPra for MN1 and creates a CST, and transmits an Active Notification (AN) to the LRM2 (step S6). In response to this, the LRM2 transmits to the AR3 an IPra Update (IPU) for indicating defining the CST, CDT of the router (step S7).

According to this embodiment, an LRM can grasp the locations of ARs. When an MN reaches a boundary AR, the LRM recognizes a neighbor LRM to which a neighbor or adjacent AR belongs, and forwards the CDT information of the correspondent node to the recognized LRM. Therefore, it is no longer necessary to ask the old LRM about the CDT information after MN hand-over. The time required until transmitting an IPra Update for performing cache determination to an access router can be shortened. That is, it becomes possible to revise cache immediately after handing-over, and reduce the time required for creating the cache table of the correspondent node. As a result, the communication quality at handing-over is improved.

And it is not necessary for a moving MN to notify the old LRM information, and therefore control signals transmitted among radio lines, that is, radio resource can be saved.

In the above embodiment, by looking at the table, the LRM determines an LRM to which the CDT information is forwarded. However, there can be other methods of determining such an LRM; for example, such an LRM can be determined by a predetermined procedure, operation, etc.

Next, with reference to FIG. 4, a procedure for deleting the CDT information is explained below, in a case where after completing forwarding the CDT information and transferring, the MN1 returns to the AR1 from the boundary AR2.

Figure 4:
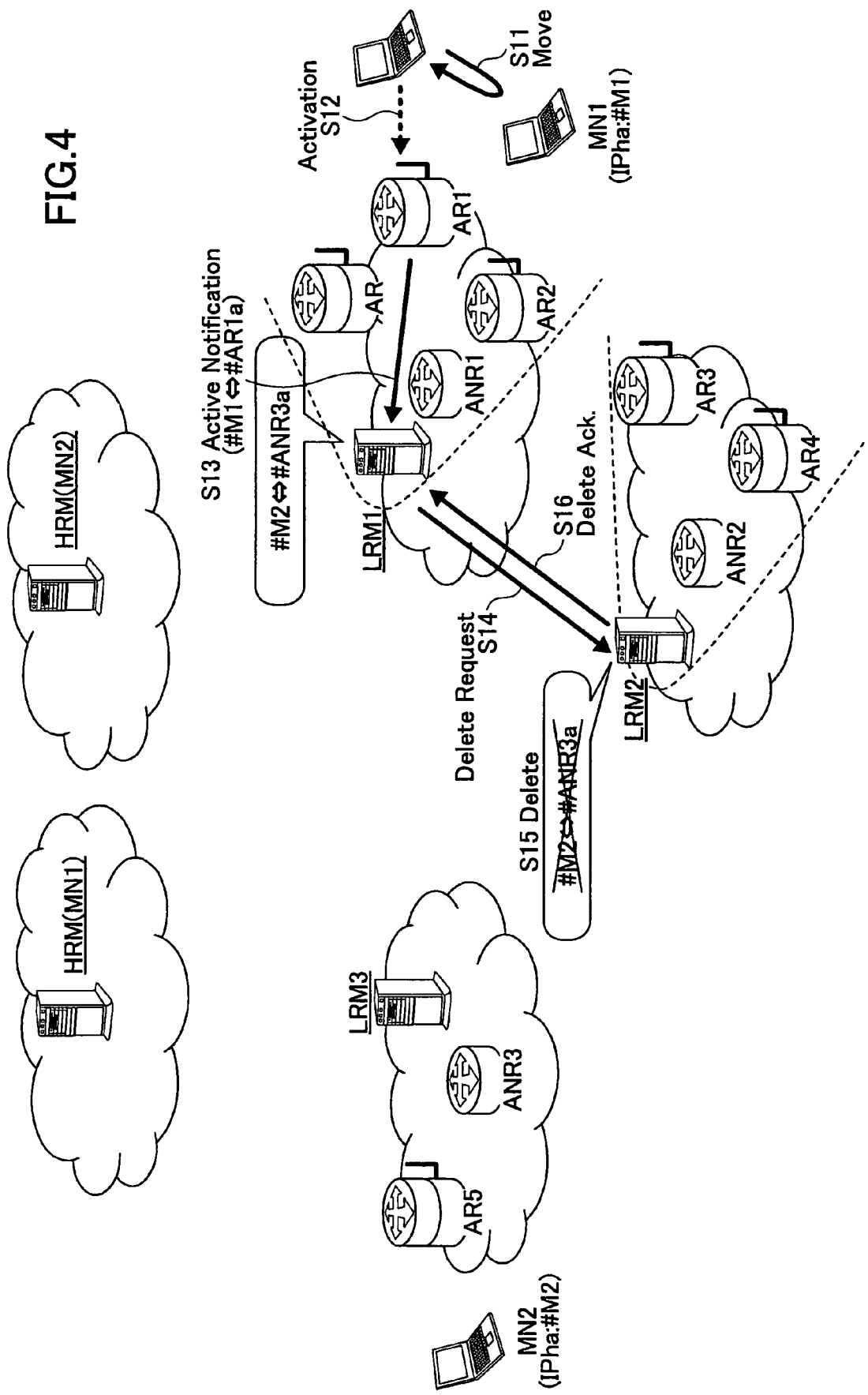
FIG. 4 schematically shows a procedure of deleting information in a neighbor LRM according to another embodiment of the present invention.
Figure 5:
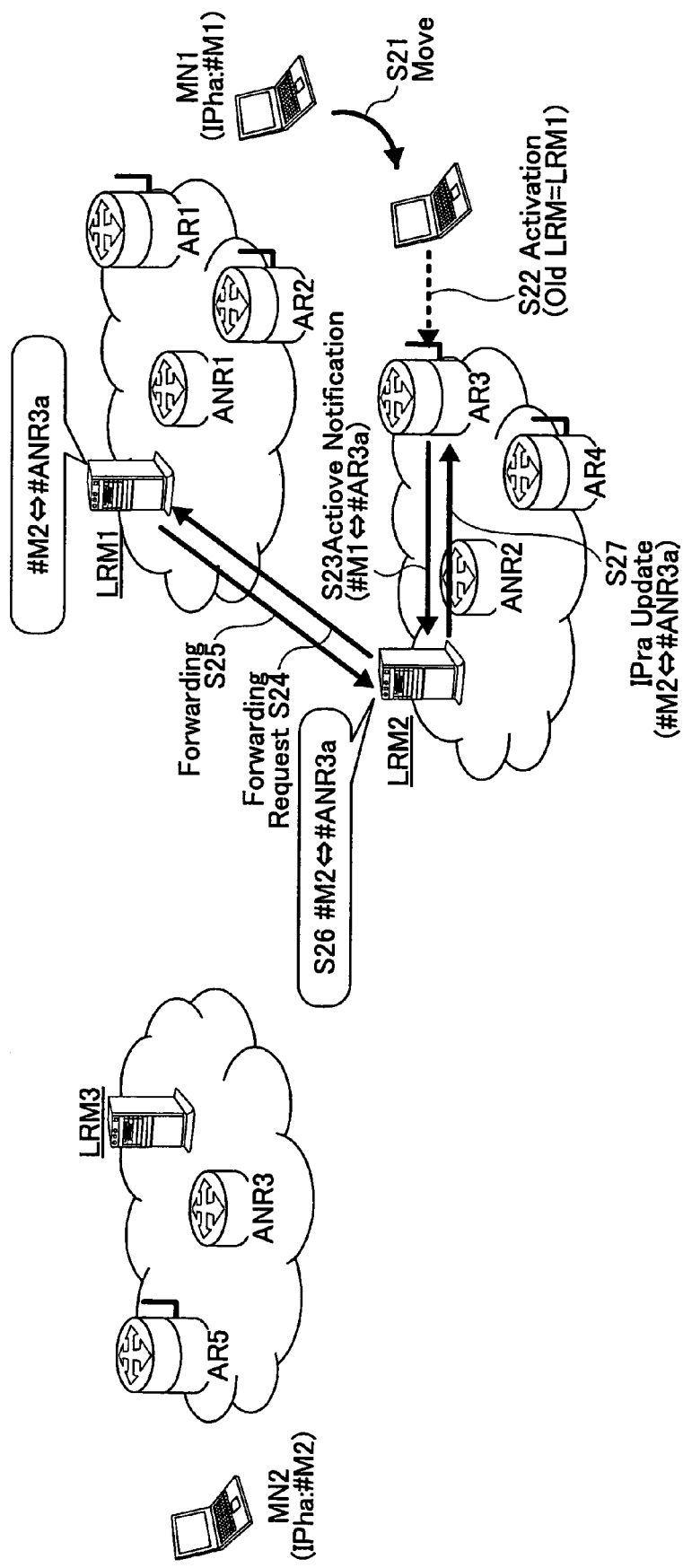
FIG. 5 schematically shows a procedure of taking over CDT information in a related art mobile communication network system.

In FIG. 4, the MN1 moves from a boundary AR (the AR2) to an internal AR (the AR1) (step S11). Thereafter, the MN1 transmits an Activation indicating that the MN1 is connected to the AR1 (step S12). After receiving the Activation, the AR1 allocates an IPra for the MN1, creates an CST (#M1←→AR1a) and transmits an Active Notification (AN) to LRM1 managing the MN1 (step S13).

The LRM1 transmits a Delete Request to the LRM2 which has received the CDT information and performing taking over procedures when the MN is connected to the boundary AR2 (step S14). In response to receiving the Delete Request, the LRM2 deletes the forwarded CDT information (step S15, shown by a cross in FIG. 4), and sends a Delete Ack indicating the deletion to the LRM1 (step S16).

According to this embodiment, the LRM1 recognizes that the MN1 returns to the internal AR, and have the LRMs delete the forwarded CDT information, and therefore, the lengthy information forwarded to the neighbor LRM can be deleted.

In the embodiment, a transport network corresponds to the IP-BB 30, a network control apparatus corresponds to the NCPF 20 and a mobility managing apparatus corresponds to the LRM2, 2.

The present application is based on Japanese Priority Application No. 2004-060454 filed on Mar. 4, 2004 with the Japanese Patent Office, the entire contents of which are hereby incorporated by reference.

What is claimed is:

1. A mobile communication network system comprising:
a plurality of routers; and
a mobility managing apparatus configured to control mobility of a mobile node,
wherein the mobility managing apparatus includes:
a table to store information about geographical locations of routers to which the mobile node is to be connected, the information including a boundary router controlled under the mobility managing apparatus in association with an adjacent router that is adjacent to the boundary router and controlled under a neighbor mobility managing apparatus;
a router determination unit configured to determine whether the mobile node has reached the boundary router managed by the mobility managing apparatus and, if the mobile node has moved to the boundary router, determine the neighbor mobility managing apparatus by detecting the adjacent router from the table; and
a correspondent node information forwarding unit configured, upon detection of the mobile node having reached the boundary router, to transmit information about a correspondent node that is communicating with the mobile node to the neighbor mobility managing apparatus,
wherein the neighbor mobility managing unit receives and stores the forwarded information before the mobile node is connected to the adjacent router, and configure the stored information after the mobile node is connected to the adjacent router and an Active Notification from the adjacent router is received at the neighbor mobility managing apparatus.

2. The mobile communication network system as claimed in claim 1, wherein the mobility managing apparatus further comprises a delete instruction transmitting unit configured to transmit instruction data having the neighbor mobility managing apparatus delete the information of the correspondent node when the mobile node moves from the boundary router to an internal router.

3. The mobile communication network system as claimed in claim 1, wherein the forwarded information of the correspondent node is location information of the correspondent node.

4. The mobile communication network system according to claim 1, wherein the mobility managing apparatus further comprises:
a delete requesting unit configured to request the neighbor mobility managing apparatus to delete the stored information of the correspondent node, when the boundary router detecting unit detects that the mobile node returns from the boundary of the boundary router to the router; and
a notice receiving unit configured to receive a notice from the neighbor mobility managing apparatus that the neighbor mobility management unit has deleted the stored information of the correspondent node.

5. A mobility managing apparatus having a function of managing information of a correspondent node communicating with a mobile node and a function of controlling hand-over, comprising:
a table to store information about geographical locations of routers to which the mobile node is to be connected, the information including a boundary router located under the mobility managing apparatus in association with an adjacent router that is adjacent to the boundary router and located under a neighbor mobility managing apparatus;

a router determination unit configured to determine whether the mobile node has reached the boundary router managed by the mobility managing apparatus and, if the mobile node has moved to the boundary router, determine the neighbor mobility managing apparatus by detecting the adjacent router from the table; and a correspondent node information forwarding unit configured, upon detection of the mobile node having reached the boundary router, to transmit information about a correspondent node that is communicating with the mobile node to the neighbor mobility managing apparatus so as to allow the neighbor mobility managing unit to receive and store the forwarded information before the mobile node is connected to the adjacent router, and configure the stored information after the mobile node is connected to the adjacent router and an Active Notification from the adjacent router is received at the neighbor mobility managing apparatus.

6. The mobility managing apparatus as claimed in claim 5, wherein the forwarded information of the correspondent node is location information of the correspondent node.

7. The mobility managing apparatus according to claim 5, further comprising:

a delete requesting unit configured to request the neighbor mobility managing apparatus to delete the stored information of the correspondent node, when the boundary router detecting unit detects that the mobile node returns from the boundary of the boundary router to the router; and a notice receiving unit configured to receive a notice from the neighbor mobility managing apparatus that the neighbor mobility management unit has deleted the stored information of the correspondent node.

* * * * *